United States Patent [19]
Adams

[11] 3,832,936
[45] Sept. 3, 1974

[54] INTEGRAL POWER STEERING GEAR

[75] Inventor: Frederick John Adams, Compton near Shefford, England

[73] Assignee: Cam Gears Limited, Hitchin, England

[22] Filed: Jan. 29, 1973

[21] Appl. No.: 327,419

[30] Foreign Application Priority Data
Feb. 8, 1972 Great Britain.................... 5775/72

[52] U.S. Cl. ............................... 91/375 A, 92/165
[51] Int. Cl. ............................................ F15b 9/10
[58] Field of Search............... 91/375 A, 375 R, 368

[56] References Cited
UNITED STATES PATENTS

| | | | |
|---|---|---|---|
| 3,291,002 | 12/1966 | Folkerts | 91/375 A |
| 3,359,866 | 12/1967 | Folkerts | 91/375 A |
| 3,508,467 | 4/1970 | Folkerts | 91/375 A |
| 3,606,819 | 9/1971 | Venable et al. | 91/375 A |
| 3,722,368 | 3/1973 | Suzuki | 91/375 R |

*Primary Examiner*—Paul E. Maslousky
*Attorney, Agent, or Firm*—Hill, Gross, Simpson, Van Santen, Steadman, Chiara & Simpson

[57] ABSTRACT

An integral power steering gear having a primary or input shaft, a secondary shaft, a valve mechanism and a power piston, all mounted on a single housing in axial alignment with one another. The power piston is movable axially relative to the valve mechanism and has a hollow formed therein which receives at least a portion of the valve mechanism depending upon the relative axial position of the power piston and the valve mechanism. The valve mechanism is located in one of the two pressure chambers located on the opposite sides of the power piston.

8 Claims, 1 Drawing Figure

PATENTED SEP 3 1974 3,832,936
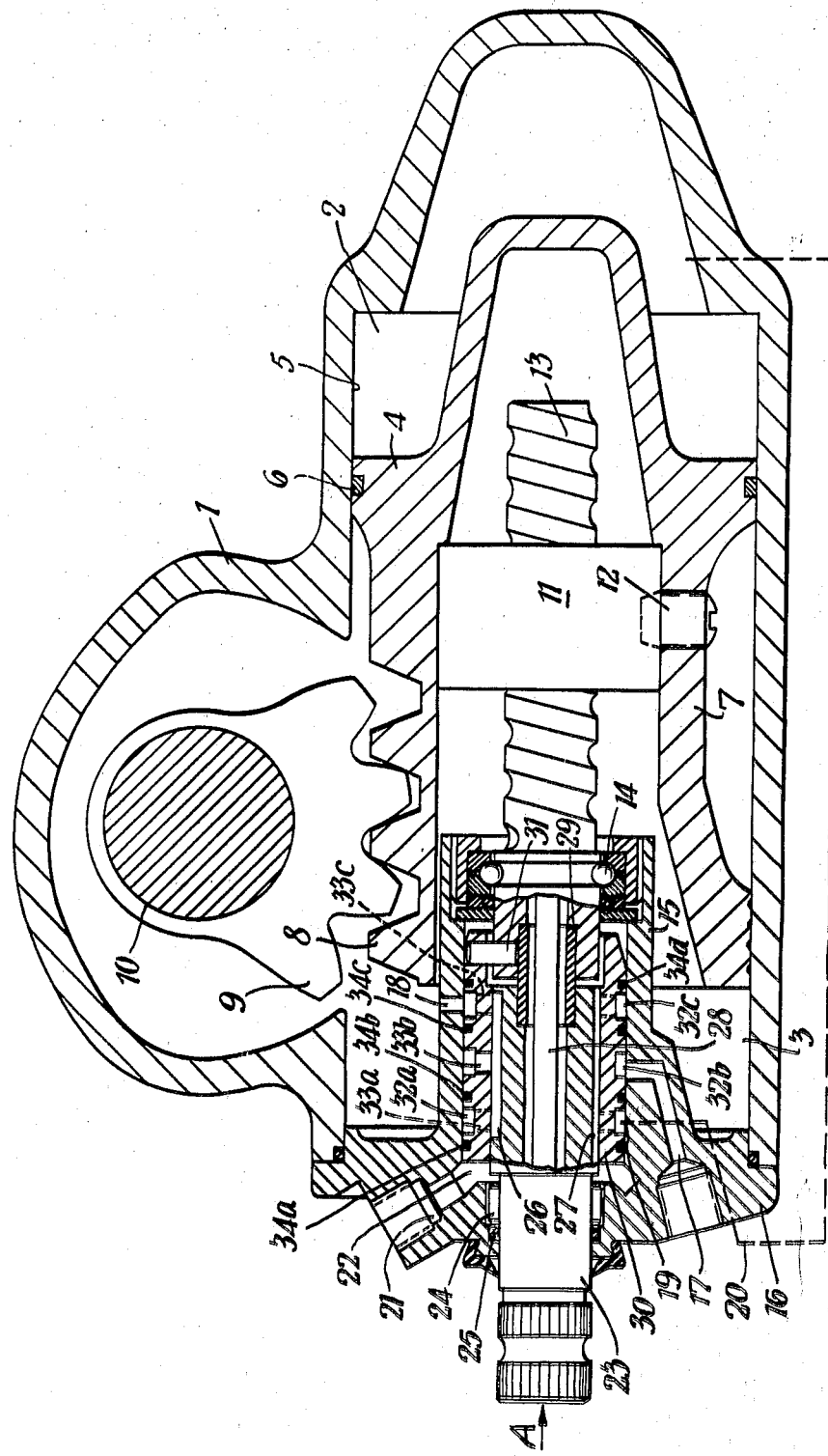

INTEGRAL POWER STEERING GEAR

BACKGROUND OF THE INVENTION

This invention relates generally to the field of power steering systems and more particularly to those systems referred to as integral steering gear.

The term "integral steering gear" is generally considered to connote a vehicular power steering system in which a variety of components, including an input shaft, an output shaft, a valve mechanism, a power piston and a pinion gear, are all mounted on or encased within a single housing structure. Thus, integral steering gear may be distinguished from other vehicular power steering systems in which the power piston is carried in a housing remote from and separate and distinct from the housing in which the valve mechanism is mounted.

Integral steering gear is used primarily in large commercial vehicles such as buses and trucks. One of the advantages of integral steering gear is the compactness which results from the use of only a single housing which carries not only the power piston but the valve mechanism as well.

It has been a continuing aim of those skilled in the art to provide integral steering gear of greater compactness and it is to this goal that the present invention is primarily addressed.

SUMMARY OF THE INVENTION

The invention may be summarized as comprising an integral steering gear in which the power piston and the valve mechanism are axially movable with respect to one another and the power piston is formed with a hollow for receiving the valve mechanism to an extent which depends upon the relative axial disposition of the power piston and the valve mechanism. Thus instead of requiring a housing sufficiently large to enable the valve mechanism to be locally axially adjacent the power piston in all positions of the power piston, the present invention permits the housing to be reduced to the extent the valve mechanism and the power piston axially overlap.

In view of the foregoing it is an object of the invention to provide an integral steering gear having extreme compactness achieved by a complementary construction and disposition of various component parts. Features of this construction include the disposition of the valve mechanism within a pressure chamber of the hydraulic motor and the provision of a piston shape such that part of the swept volume of the piston which would otherwise constitute a lost space may be utilized, e.g., for the accommodation of the valve mechanism.

According to the invention a power steering gear comprises, in combination, a primary or input shaft operatively and coaxially connected by a torque-sensitive valve mechanism to a secondary, threaded shaft, the threaded shaft being threadedly engaged with a hollow rack element, which rack element comprises a portion of a double acting power piston of a linear hydraulic motor and engages with a steering pinion, wherein the hollow of the rack element accommodates the valve mechanism, more or less, according to the position of the gear.

In accordance with the principles of the invention the torque-sensitive valve mechanism, the threaded shaft, the steering pinion and hydraulic motor are all enclosed by the same gear housing and the valve mechanism and preferably the steering pinion may be situated within a pressure chamber of the motor, so as to be exposed to the pressure therein.

The primary and secondary shafts are preferably coaxial and may be interconnected by torsionally elastic means, which means comprises the torque-sensitive element of the valve mechanism, the valve unit additionally comprising a ported and ducted casing, a ported and ducted valve sleeve having a free running fit in the casing and connected for joint rotation with the secondary shaft, the input or primary shaft having a close rotating fit in the valve sleeve and being provided with ducts in the form of axially extending grooves.

In the embodiment of the invention disclosed herein the valve casing is in the form of an elongated end cap sealingly engaged with the gear housing and supports bearings for journalling at least one of the shafts. The secondary shaft is engaged with the power piston of the hydraulic motor by means of a nut which is rigidly fixed to the piston and which is preferably of the recirculating ball type.

Many other features, advantages and additional objects of the present invention will become manifest to those skilled in the art upon making reference to the detailed description which follows and the accompanying drawing, in which a preferred embodiment incorporating the principles of the present invention are shown by way of illustrative example only.

BRIEF DESCRIPTION OF THE DRAWING

The drawing illustrates a longitudinal sectional view of an integral steering gear incorporating the principles of the invention with portions shown in elevation.

DESCRIPTION OF THE PREFERRED EMBODIMENT

Referring to the drawing, the embodiment of the invention shown therein comprises a housing or casing, indicated generally at reference numeral 1, which is divided into two separate pressure chambers 2 and 3 by means of a power piston 4 axially slidable in a bore 5 formed in the housing 1 and sealed by means of a conventional sealing ring identified at reference numeral 6. The power piston 4 comprises an extended portion 7 which is provided with gear or rack teeth 8, which teeth engage in meshing relation complementary teeth 9 formed on a sector or pinion gear 9a mounted fast on a cross shaft 10. The gear 9a effectively constitutes the steering pinion of the integrated unit, and the cross shaft 10 is supported for rotation on the housing 1 and extends through the housing to carry a pitman arm for connection to the steering linkage of the vehicle on which the housing 1 is mounted.

Housed within the piston extension or rack element 7 is a nut 11, which may be of the recirculating ball type and which is precluded from axial and rotational movement relative to the piston 4 by means of a peg or threaded stud 12. Engaged with the nut 11 is a complementary secondary or worm shaft 13, one end of which is carried for rotation in a bearing 14. The bearing 14 is supported, in turn, in an inward extension 15 of a ported and ducted end cap 16 which is mounted in leak-proof relation on the gear housing 1, the extension 15 serving as the casing portion of a rotary control valve mechanism or unit indicated generally at reference numeral 35. The extension 15 is more or less shrouded by the power piston 4, depending upon the position of the piston 4.

The end cap 16 comprises a pressurized fluid inlet 17 for supplying high pressure fluid from an engine driven pump. The extension 15 is ported as indicated at reference numeral 18 for communication with the leftward pressure chamber 3 and is additionally ported as indicated at 19 for communication with the rightward pressure chamber 2 via a duct indicated schematically by the broken line shown at reference numeral 20. The end cap 16 also comprises a fluid outlet 21 and an associated chamber 22 for return of the pressurized fluid to the engine driven pump or a reservoir or the like associated therewith.

A primary or input shaft 23, to which may be connected the conventional steering wheel and through which the driver-imposed torque is transmitted to the valve mechanism 35, is supported in a bearing 24 and is sealed by means of a seal ring 25 carried in the end cap 16. The input shaft 23 is coaxially aligned with the secondary shaft 13 and extends into the extension 15 of the end cap 16. In addition, the input shaft 23 is provided with a series of circumferentially spaced axially extending slots or grooves 26 and 27 for the transmission of the pressurized fluid to the pressure chamber ports 18 and 19 or to the exhaust chamber 22.

The input shaft 23 and the secondary or worm shaft 13 are interconnected by torsionally elastic means such as a torsion bar indicated at reference numeral 28, the two shafts 23 and 13 being axially aligned by means of a hollow bearing bush 29. Complementary driving dogs are formed on the shafts 23 and 13 to limit the degree of relative rotation between the shafts 23 and 13 and to provide a direct drive therebetween in the event the power pump or the torsion rod 28 fails.

The valve mechanism 35 also comprises a distributor or valve sleeve 30 which is interposed between the input shaft 23 and the valve casing or extension 15. The valve sleeve 30 is rotatable relative to the input shaft 23 as well as the valve casing 15 but is connected for joint rotation to the secondary or worm shaft 13 by means of a radial pin indicated at reference numeral 31.

Disposed around the periphery and axially spaced along the valve sleeve 30 are circumferentially continuous annular grooves 32a, 32b and 32c which cooperate with the ports 19, 17 and 18 respectively. Short radial ducts 33a, 33b and 33c extend inwardly through the valve sleeve 30 from the annular grooves 32a, 32b and 32c and each alternatively either cooperates with one of the ducts or grooves 26 or 27 or is blocked by the outer surface of the input shaft 23, that is, the lands which separate the slots 26 and 27, depending upon the direction of relative rotation of the input shaft 23 and the valve sleeve 30. Sealing rings 34a, 34b, 34c and 34d which extend circumferentially around the periphery of the valve sleeve 30 retain the pressure fluid in the appropriate grooves separated thereby.

The operation of the steering gear may be described as follows. The application of a torque by the driver of the vehicle in a clockwise direction (as the same is considered with respect to the arrow indicated at reference character A) imparts a rotation in the same direction to the input shaft 23 and thus to the secondary or worm shaft 13, although due to the interconnection thereof by means of the torsion rod 28, some relative rotation will occur between the shaft 23 and 13, the degree of which increases with increasing torque, which in turn depends upon the forces tending to resist movement of the steered wheels which are transmitted back to the integral steering gear via the steering linkage from the road wheels. Clockwise rotation of the worm shaft 13 in the nut 11 serves to impart a linear motion to the nut 11, and hence to the power piston 4, in a leftward direction with a corresponding rotation of the cross shaft 10, which in turn will serve to turn the dirigible wheels of the vehicle to the right. In addition, high pressure fluid is transmitted, through the port 17, the groove 32b, the duct 33b, the duct 26, the duct 33a, the groove 32a, the port 19 and the port 20, to the rightward pressure chamber 2, thus affording power assistance to the leftward movement of the power piston 4. At the same time the leftward pressure chamber 3 is open to exhaust via the port 18, the grooves 32c, the duct 33c, the duct 27, the chamber 22 and, finally, the ports 21. It is noted that in this relative position of the input shaft 23 and the worm shaft 13, the duct 33c is blocked from communication with the duct 26, and the ducts 33a and 33b are blocked from communication with the duct 27.

The application of a driver's torque in the opposite direction will produce a corresponding relative rotation between the valve sleeve 30 and the input shaft 23. This relative rotation will be reversed from that discussed above, however, so that high pressure fluid is supplied to the leftward pressure chamber 3 via the port 17, the groove 32b, the duct 33b, the duct 26, the radial duct 33c, the annular groove 32c and the port 18, thus affording power assistance to the rightward movement of the piston 4. At the same time the rightward pressure chamber 2 communicates with the exhaust port via the duct 20, the port 19, the groove 32a, the radial duct 33a, the duct 27, the chamber 22 and, finally, the outlet port 21. In this relative rotational position of the input shaft 23 and the valve sleeve 30 and the worm shaft 13, the ducts 33b and 33c are blocked from communication with the duct 27 and the duct 33a is blocked from communication with the duct 26.

From the foregoing description and the attached drawing it is apparent that the integral steering gear disclosed herein is extremely compact. The casing which forms the stationary portion of the valve mechanism 35 actually constitutes an axial extension of the end cap of the gear housing. The valve mechanism itself is housed in a hollow portion of the power piston to an extent depending upon the axial disposition of the power piston and the valve mechanism. The rack teeth are formed on the hollow portion of the power piston whereby the valve mechanism 35 extends into the hollow of the power piston and is surrounded by the rack teeth in all positions of the power piston.

In addition, the valve mechanism 35 and particularly the stationary housing or casing portion thereof extends into the hollow of the power piston 4 a distance whereby a transverse or radial line extending through the distal or inner end thereof intersects the cross shaft 10.

Although minor modifications might be suggested by those versed in the art, it should be understood that I wish to embody within the scope of the patent warranted hereon all such modifications as reasonably come within the scope of my contribution to the art.

I claim:

1. An integral steering gear comprising, in combination, a housing, a primary shaft extending into said housing, a secondary shaft in said housing, valve means in said housing operatively interconnecting said primary and secondary shaft, said valve means including a casing immovably secured to and projecting into said housing, piston means operatively connected to said secondary shaft and having a rack element formed thereon, said primary and secondary shafts, said valve means and said piston means being coaxially arranged and said piston means being axially movable relative to said primary and secondary shafts and to said valve means, a pinion meshing with said rack element, and means forming a hollow in said piston means receiving even in a mid-stroke piston position at least a portion of said valve means and said casing depending upon the relative axial position thereof with respect to said piston means.

2. The invention as defined in claim 1 wherein said hollow is formed in said rack element.

3. The invention as defined in claim 1 and including means in said housing forming a power cylinder in which said piston means is axially movable and which is divided by said piston means into a pair of pressure chambers, said valve means being located within one of said pressure chambers.

4. The invention as defined in claim 1 in which said valve means comprises torsionally elastic means.

5. The invention as defined in claim 4 in which the casing for said valve means is ported and ducted and has a ported and ducted valve sleeve rotatably carried therein and connected to said secondary shaft for joint rotation, and said primary shaft includes a portion forming a valve core rotatably carried within said valve sleeve and having formed thereon axially extending grooves.

6. The invention as defined in claim 5 in which said casing comprises an elongated end cap sealingly mounted on said housing.

7. The invention as defined in claim 6 including bearing means mounted on said end cap for journalling at least one of said shafts.

8. The invention as defined in claim 1 wherein said piston means is operatively connected to said secondary shaft by means of a recirculating ball nut mounted on said piston means.

* * * * *